Patented Apr. 30, 1935

1,999,611

UNITED STATES PATENT OFFICE 1,999,611

ANTHRAQUINONO-2',1',1,2-ANTHRAQUINONES AND A PROCESS OF PREPARING THEM

Georg Kränzlein, Ernst Diefenbach, and Martin Corell, Frankfort-on-the-Main, Germany, assignors to General Aniline Works, Inc., New York, N. Y., a corporation of Delaware No Drawing. Application October 18, 1933, Serial No. 694,196. In Germany October 20, 1932

4 Claims. (Cl. 260—61)

The present invention relates to anthraquinono-2',1',1,2-anthraquinones and to a process of preparing them.

We have found that anthraquinono-2',1',1,2-anthraquinones which are valuable starting materials for the preparation of dyestuffs are easily obtainable in a smooth reaction by ω-chlorinating a 1,5-diaroyl-2,6-dimethylnaphthalene compound and condensing the hexachlorine compound thus obtained to the corresponding anthraquinono-2',1',1,2-anthraquinone compound, for instance, by heating the hexachlorine compound at a temperature of about 180° C. in the presence of an acid condensing agent. During the chlorination which is advantageously performed at raised temperature in the presence of a suitable solvent, such as, for instance, trichlorobenzene, and while exposing the reaction mixture to ultra violet rays, the chlorination products crystallize in a very pure state. They may be transformed into the corresponding anthraquinono-2',1',1,2-anthraquinones in an easy manner by treatment with, for instance, concentrated sulfuric acid or chlorosulfonic acid. The yields amount to 70–80% of the theoretical.

The following examples serve to illustrate the invention but they are not intended to limit it thereto, the parts being by weight, unless otherwise stated:

(1) 36 parts of 1,5-dibenzoyl-2,6-dimethylnaphthalene are dissolved in 100–120 parts of trichlorobenzene. The solution is heated to 200° C. and treated in a suitable apparatus, while exposed to the rays of a mercury-quartz lamp and stirred, with a finely divided stream of chlorine until the increase in weight amounts to 20 parts. Towards the end of the chlorination a colorless, crystalline substance, the hexachloro-compound, begins to precipitate. After cooling, it may be filtered with suction, washed with hexahydrobenzene and dried. The chlorination product still present in the trichlorobenzene mother liquor may be obtained by blowing off the solvent by means of steam.

The chlorination product thus obtained is introduced, while stirring, into 10 times its weight of concentrated sulfuric acid. The mass is then heated until vivid evolution of hydrochloric acid sets in. After this evolution has ceased, the temperature is raised to about 150–about 180° C. and maintained at this value for about 1 hour. The whole is then allowed to cool, poured on ice water, the precipitate is filtered with suction and freed from the main quantity of adherent sulfuric acid by washing with water and is then extracted with dilute sodium carbonate solution, washed until neutral and dried. The anthraquinono-2',1',1,2-anthraquinone is identical with the product described in the literature.

(2) 43 parts of 1,5-di-(ortho-chlorobenzoyl)-2,6-dimethylnaphthalene, melting at 235° C., are dissolved in 120–130 parts of trichlorobenzene and chlorinated at 160° C.–170° C. as described in Example 1. When an increase in weight of about 20 parts has been arrived at, the whole is cooled and the crystalline hexachloro derivative which has been precipitated is isolated. A further quantity of the reaction product may be obtained from the trichlorobenzene mother liquor by removing the solvent by means of steam.

10 parts of the chlorination product thus obtained are introduced, while stirring, into 100 parts of concentrated sulfuric acid which has been heated to about 80° C.–about 90° C. During the introduction, vivid evolution of hydrochloric acid takes place and the melt assumes an orange-red coloration. When the evolution of hydrochloric acid is nearly finished, the temperature is quickly raised to 180° C. The color of the solution thereby becomes a dark red. After a short time, a solid substance begins to precipitate from the hot melt and finally forms a tough magma of fine yellow crystalline needles. The whole is then allowed to cool and the 8,8'-dichloro-(anthraquinono-2',1',1,2-anthraquinone) which has separated is well filtered from the sulfuric acid by suction through an acid-proof filter. The residue on the filter is suspended in water, again filtered, extracted by means of hot dilute sodium carbonate solution and washed on the filter until neutral.

In an analogous manner there are obtained from the 1,5-diaroyl-2,6-dimethylnaphthalenes obtainable by means of other aroylhalogenides the corresponding derivatives of anthraquinono-2',1',1,2-anthraquinone.

(3) 50 parts of the chlorination product obtainable according to the process described in Example 1, from 1,5-di-(2',5'-dichlorobenzoyl)-2,6-dimethylnaphthalene, melting at 233° C.–235° C., are slowly heated, while stirring, in 500 parts by volume of concentrated sulfuric acid to about 170° C.–about 180° C. When the vivid evolution of hydrochloric acid has ceased, the temperature is maintained at the above value until the tetrachloroanthraquinono-anthraquinone has precipitated in the form of crystals from the red solution. After cooling, the whole is filtered with suction, the solid matter is washed first with sulfuric acid of 60° Bé. and then with water. There is thus obtained the 5,8,5',8'-tetrachloro-anthraquinono-2',1',1,2-anthraquinone of the following formula:

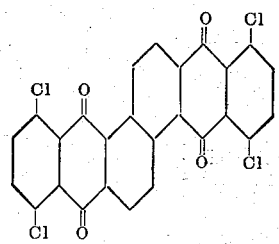

in the form of yellow needles which melt at about 417° C. It is insoluble in cold concentrated sulfuric acid. In warm concentrated sulfuric acid it dissolves to a yellowish brown solution. With hydrosulfite it yields in an alkaline solution a red vat. The yield amounts to 75% of the theoretical.

(4) In a similar manner the 2,6-dimethyl-1,5-di (β-naphthoyl) naphthalene which has been described in the literature (cf. Berichte der deutschen chemischen Gesellschaft, vol. 62, page 1832) may be transformed into the corresponding 5,6,5',6' - dibenzoanthraquinono-2',1',1,2-anthraquinone by chlorination of its methyl groups and subsequent ring closure by means of sulfuric acid. The product thus obtained has the following formula:

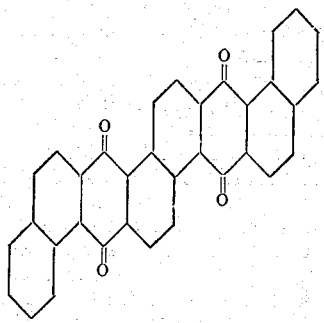

It forms yellow needles which dissolve very difficultly in organic solvents and yields with hydrosulfite in an alkaline solution a red vat.

We claim:

1. The process which comprises ω-chlorinating a 1.5-diaroyl-2.6-dimethylnaphthalene compound, said aroyl substituents being of the benzene series, and condensing the hexachlorine compound, thus obtained, to the corresponding anthraquinono-2',1',1,2-anthraquinone compound by heating it at a temperature of about 180° C. in presence of an acid condensing agent.

2. The process which comprises ω-chlorinating 1,5-di-(2',5'-dichlorobenzoyl)-2,6-dimethylnaphthalene and condensing the hexachlorine compound thus obtained, to the corresponding anthraquinono-2',1',1,2 - anthraquinone compound by heating it at a temperature of about 170° C. to about 180° C. in presence of concentrated sulfuric acid.

3. The process which comprises ω-chlorinating 1,5-di-benzoyl 2,6-dimethylnaphthalene and condensing the hexachlorine compound, thus obtained, to the corresponding anthraquinono-2',1',1,2-anthraquinone compound by heating it at a temperature of about 150° C. to about 180° C. in presence of concentrated sulfuric acid.

4. The compound of the following formula:

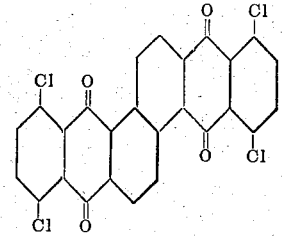

forming yellow needles which melt at about 417° C., being insoluble in cold concentrated sulfuric acid, dissolving in warm concentrated sulfuric acid to a yellowish-brown solution and yielding with hydrosulfite in an alkaline solution a red vat.

GEORG KRÄNZLEIN.
ERNST DIEFENBACH.
MARTIN CORELL.